United States Patent
Valenzuela et al.

(10) Patent No.: US 7,347,572 B1
(45) Date of Patent: Mar. 25, 2008

(54) TELESCOPE MIRROR FOR HIGH BANDWIDTH FREE SPACE OPTICAL DATA TRANSMISSION

(75) Inventors: Arnoldo Valenzuela, Munich (DE); Giuseppe Valsecchi, Oggiono (IT); Robert David Banham, Suffolk (GB); Fabio Marioni, Saronno (IT)

(73) Assignee: Media Lario S.R.L., Bosisio Parini (LC) (IT)

( * ) Notice: Subject to any disclaimer, the term of this patent is extended or adjusted under 35 U.S.C. 154(b) by 0 days.

(21) Appl. No.: 09/577,209

(22) Filed: May 23, 2000

(51) Int. Cl.
*G02B 5/08* (2006.01)
*G02B 5/10* (2006.01)
*G02B 7/182* (2006.01)
*C25D 1/06* (2006.01)
*C25D 7/08* (2006.01)

(52) U.S. Cl. .................. 359/846; 359/859; 359/883; 359/900; 205/70; 205/71; 205/116

(58) Field of Classification Search ................ 359/883, 359/900, 846, 858, 859; 204/192.27; 205/70, 205/71, 79, 116
See application file for complete search history.

(56) References Cited

U.S. PATENT DOCUMENTS

| | | | | |
|---|---|---|---|---|
| 2,135,873 A | * | 11/1938 | Jones et al. ................ 205/71 |
| 3,378,469 A | * | 4/1968 | Jochim ..................... 205/50 |
| 3,428,533 A | * | 2/1969 | Pichel ...................... 205/70 |
| 3,790,257 A | * | 2/1974 | Goldstein et al. ........... 359/845 |
| 3,905,778 A | * | 9/1975 | Pearson .................... 428/593 |
| 3,939,046 A | * | 2/1976 | Conn et al. ................ 205/73 |
| 4,484,798 A | * | 11/1984 | Howden ................... 427/162 |
| 4,648,944 A | * | 3/1987 | George et al. .............. 205/82 |
| 4,740,276 A | * | 4/1988 | Marmo et al. .............. 205/71 |
| 4,786,376 A | * | 11/1988 | Vaaler ..................... 205/67 |
| 5,323,266 A | * | 6/1994 | Flint et al. ................. 359/566 |
| 6,278,764 B1 | * | 8/2001 | Barbee et al. .............. 378/84 |
| 6,406,611 B1 | * | 6/2002 | Engelhaupt et al. ........ 205/259 |

FOREIGN PATENT DOCUMENTS

EP   1152555   * 11/2001

OTHER PUBLICATIONS

Korte, "High-throughput replica optics"; Applied Optics; vol. 27, No. 8; Apr. 15, 1988; pp. 1440-1446.*
R. Graue et al; Ultra Lightweight Galvanic Mirrors; Part of the SPIE Conference on Advanced Technology Optical/IR Telescopes VI; SPIE vol. 3352; Mar. 1998; pp. 151-157.*

\* cited by examiner

*Primary Examiner*—Ricky D. Shafer
(74) *Attorney, Agent, or Firm*—The Small Patent Law Group LLP; Dean D. Small

(57) ABSTRACT

Optical mirror elements for high bandwidth free space optical communication are produced by an electroforming replication technique. Onto the precision surface of a mandrel that is a negative of the required optical surface a layer of metal is deposited forming an exact copy of the mandrel surface and is then separated to form the required optical element. During the production process the mandrel may be coated with a variety of materials that are then separated together with the electroformed optical element during the release step to form a monolithic structure that includes a reflective coating. The mandrel remains unchanged by the process and can then be re-used. The high cost of conventional polishing techniques is therefore limited to the production of the mandrel. The replication process results in the production of low cost optical elements suitable for high bandwidth free space optical data transmission.

20 Claims, 4 Drawing Sheets a) MASTER MACHINING b) MASTER POLISHING c) MASTER CLEANING d) REFLECTIVE LAYER DEPOSITION e) ELECTROFORMING f) RELEASE

TELESCOPE MIRROR FOR HIGH BANDWIDTH FREE SPACE OPTICAL DATA TRANSMISSION

BACKGROUND OF THE INVENTION

The present invention relates to the use and manufacturing process of telescope mirrors for high bandwidth free space optical data transmission.

The increased need for high bandwidth (high data rate) communication links induced by the recent growth of the internet and other telecommunication means lead to renowned interest in the free space optical data transmission (Whipple, "Free space communications connects", Photonics at work, October 1999). In free space optical communications the data are transmitted through a communication link between a transmitting station to a receiving station by a laser being preferably having a frequency of about 1550 nm without using a physical medium like an optical fibre or the like. Depending on the weather conditions communication links over a distance of several kilometers with a bandwidth of up to 2.5 Gb/s have been demonstrated (P. F. Szajowski et al, "Key elements of high-speed WDM terrestrial free-space optical communications systems", SPIE Paper No. 3932-01). Such free space optical telecommunication links are especially useful for connecting facilities having high data transmission needs like banks or universities in metropolitan areas with one another. Another possible application is the live and high bandwidth broadcasting of sports events, where an optical free space communication link can be set up temporarily with low costs.

In order to avoid health risks by the laser radiation the laser power has to be low (a few milliwatts) and the beam diameter must be large, about several 10 centimeters. To establish an optical free space communication link the optical signal therefor has to be coupled out of an optic fibre network and directed with a transmission telescope over the desired distance directly to the receiving telescope where the received beam has to be concentrated and coupled into an optical fibre network. The reliability and the achievable free space distances depend on the efficiency of the transmitter as well as the receiver telescopes. It is known to use high precision glass or zerodur mirrors as reflective optical elements of the transmitter as well as the receiver. These are, however, expensive to manufacture with the required precision.

There is therefore a need for cheap, reliable high precision optical elements for free space optical data transmission.

For space based X-ray telescopes reflection grating assemblies have been developed which contain up to 58 tubular shaped X-ray mirrors for concentrating the X-rays to a CCD camera. The X-ray reflectors have a combined paraboloid/hyperboloid geometry (Walter optics) and are manufactured by a nickel electroforming process using a mandrel for defining the reflector geometry (D. de Chambure, et. al, "XMM's X-Ray telescopes", esa bulletin 100, December 1999; A. Valenzuela, "Precision optics by large area replication", Proceedings 34$^{th}$ Liège International Astrophysics Colloquium 'The next generation space telescope: science drivers and technological challenges', Liège Belgium, 15-18 Jun. 1998 ESA SP-429, October 1998; D. de Chambure, et. al "Producing the X-ray mirrors for ESA's XMM spacecraft", esa bulletin 89, February 1997; R. Graue, et. al, "Jet-X mirror assemblies-galvanoplastic technology and high energy performance", 47$^{th}$ International astronautical congress, Beijing, China, Oct. 7-11, 1996).

BRIEF DESCRIPTION OF THE INVENTION

It is therefore an object of the present invention to provide an optical element suitable for high bandwidth free space optical communication which can be manufactured with high precision at moderate costs.

The problem is solved by a method of manufacturing a telescope mirror comprising the steps of: (a) providing a mandrel defining the geometry of the telescope mirror, (b) depositing a reflective layer on the mandrel surface, (c) electroforming a mirror body onto the reflective layer by an electrochemical process, (d) releasing the mirror body with the reflective layer from the mandrel, wherein the electroforming process and the release process are controlled such that the building up of internal mechanical tension within the mirror body is suppressed.

The method according to the invention provides a telescope mirror having a highly accurate geometry for achieving a high optical performance. The design geometry is realized with high accuracy with the mandrel or masterpiece by machining and polishing techniques known from optical lenses. The mandrel is preferably made of glass or zerodur material. According to the invention the geometry of the mandrel can be replicated many times and with high accuracy through the electroforming process. This high precision can be achieved by controlling the electroforming process such that the building up of internal mechanical tension within the mirror body or shell is suppressed. Consequently the deformation of the mirror geometry through the release of internal mechanical stresses can be avoided.

Furthermore, the method according to the invention allows the production of the optical (infrared) reflective layer having very low surface roughness. The reason is that the optical surface is not, like with conventional deposition technique, the deposition side surface having an unavoidable roughness but the opposite side surface of the reflective layer having formed an interface to the smoothened and polished mandrel surface.

Preferably, the internal mechanical tension of the telescope mirror is measured during the electroforming process at an additional electroforming sample, which is processed in parallel with the telescope mirror. Alternatively an electronic stress measurement device may be employed.

In order to achieve a high surface and the geometry accuracy the deposition of the reflective layer is preferably carried out in a vacuum or electrochemical environment and the release step is carried out in clean room conditions. The release step is also optimized to avoid internal mechanical tension of the telescope mirror impairing geometry accuracy. Therefore, the release process must be performed uniformly over the whole geometry and a sticking of mirror shell portions to the mandrel must carefully be avoided.

The mirror body can be electroformed using nickel or a nickel alloy. Other suitable materials, however, may also be used.

The electroforming is preferably carried out using an electrochemical liquid having a temperature of between 40° C. and 70° C.

For manufacturing a thin and/or large mirror a supporting structure may be attached to the mirror body. The attachment or combining step may be carried out before or after releasing the mirror body from the mandrel. In order to avoid the building up of internal mechanical stress within the mirror body an attaching step is preferably carried out under temperature conditions similar to the operating temperature of the finished telescope mirror.

The present invention further provides a transceiver device for high bandwidth free space optical data transmission comprising at least one reflector element having: a reflector body formed by an electrochemical replication technique using a mandrel defining the geometry of the reflector element, and a thin reflective layer on the reflector body.

In order to achieve high optical performance the deviation of a reflector element geometry from the designed geometry is preferably smaller than 50 µm. Deviations even smaller than 1 µm, however, are also achievable with the present invention.

The reflector elements according to the present invention may have a wide range of different thicknesses. For thinner reflector elements a supporting structure may be used. It is also possible to employ a supporting structure including actuators for adapting and correcting the geometry of the reflector element.

The present invention solves the above cited object furthermore with the use of reflector elements formed by an electrochemical replication technique using a mandrel defining the geometry of the reflector element as optical mirrors for high bandwidth free space optical data transmission.

According to a still further aspect of the present invention there is provided a method of high bandwidth free space optical data transmission from a transmitter station to a receiver station wherein at least one of the transmitter station and the receiver station comprises optical reflector elements formed by an electrochemical replication technique using a mandrel which defines the geometry of optical reflector element.

The dependent claims describe further preferred features of the present invention.

BRIEF DESCRIPTION OF THE DRAWINGS

The invention will become more readily apparent from the following description of preferred embodiments in connection with the attached drawings in which:

FIG. 2a is a cross section view of an optical telescope according to the invention having a primary mirror and a secondary mirror;

FIG. 2b is a plan view of the backside of the optical telescope of FIG. 2a;

FIG. 2c is a backside plan view of another embodiment of an optical telescope according to the invention;

DETAILED DESCRIPTION OF THE INVENTION

Figure 1:
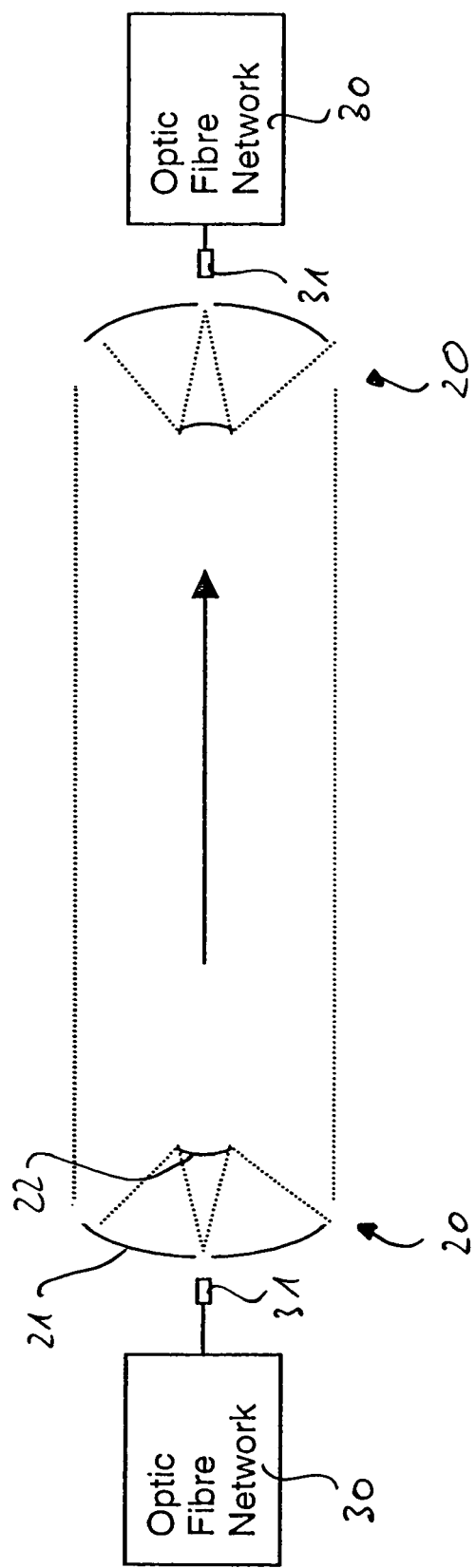
FIG. 1 is a schematic illustration of a high bandwidth free space optical communication link according to the present invention.

FIG. 1 is a schematical illustration of a free space optical communication link according to the present invention. A transmitter station (left side) and a receiving station (right side) each comprising an optical fibre network are connected by a free space communication link between transceivers 20 preferably using infrared light having a wavelength of about 1550 nm. The optical signal is coupled from the optical fibre network 30 through the optical fibre terminal 31 into the transceiver 20 comprising a primary mirror 21 and a secondary mirror 22. The optical signal is then transformed into a parallel light being having diameter of several ten centimeters. This large diameter is necessary in order to avoid potentially hazardous light intensities. The parallel light beam is then received by the receiving telescope 20 (in FIG. 1 on the right hand side). It is obvious that the transmission efficiency and so the maximum possible distance depends on an exactly parallel light beam. This can only be achieved if the mirrors 21, 22 only minimally deviate from the designed geometry. This exact geometry is on the other hand also necessary on the receiving side for achieving a high concentrator efficiency into the optical fibre network. With highly precise telescope mirrors according to the invention an optical telecommunication link having a high efficiency and performance can therefore be realized.

Figure 2:
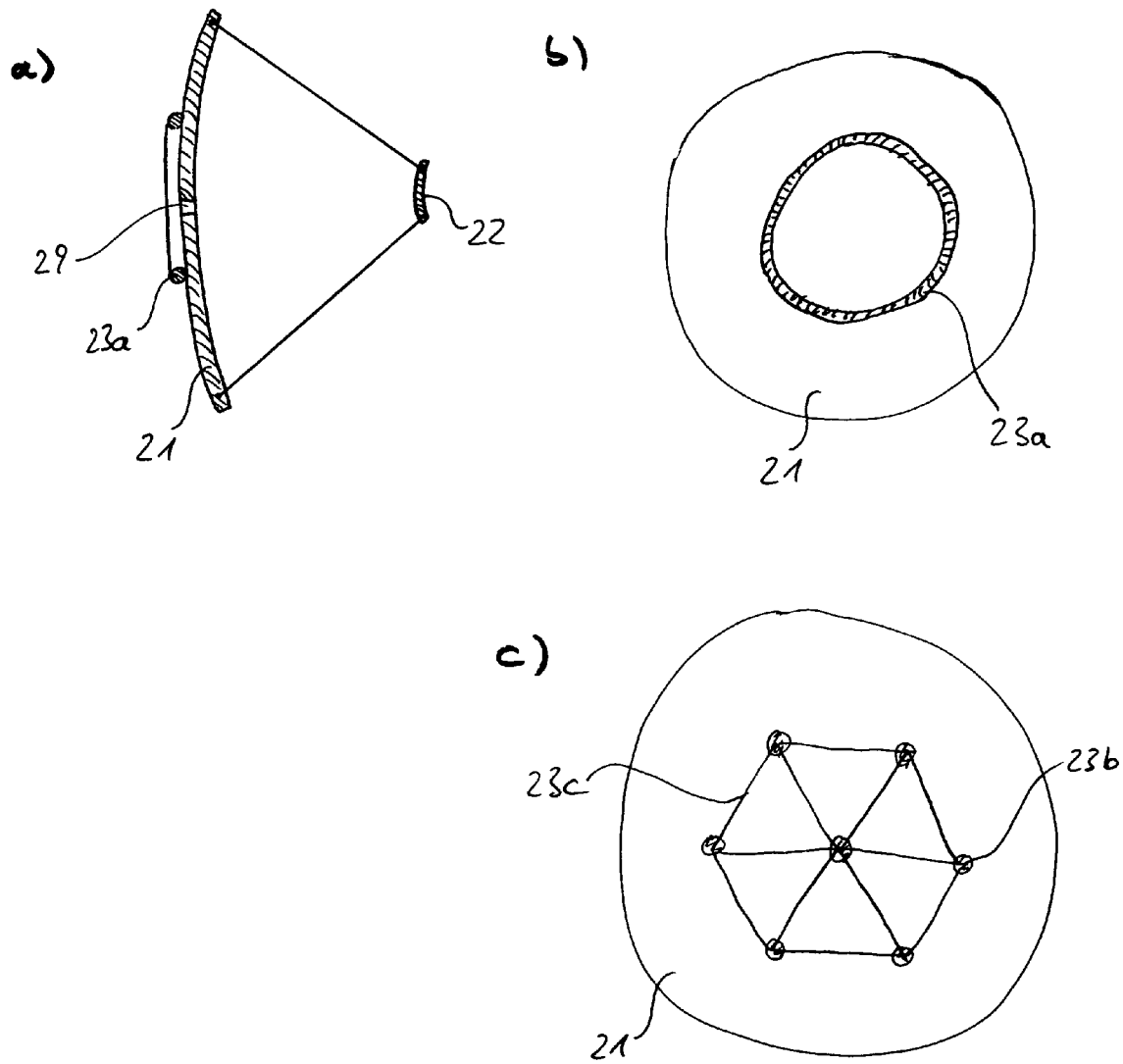

FIG. 2a shows a preferred embodiment of an optical telescope mirror according to the present invention. As shown in FIG. 1 the telescope mirror comprises a primary mirror 21 and a secondary mirror 22 being exactly positioned to transform a small diameter light beam falling through an aperture 29 into a parallel light beam. The primary mirror 21 is supported by a supporting ring 23a to stabilize the mirror geometry under the influence of gravity. In the shown embodiment the supporting structure 23a has the form of a ring as is best seen in FIG. 2b. Any other suitable geometry, however, is also conceivable.

FIG. 2c shows another embodiment of the mirror 21 according to the invention having a supporting structure comprising actuators 23b connected by supporting elements 23c. With the actuators 23b the geometry of the mirror 21 can be adapted and corrected. As actuators 23b piezoelectric elements or electromagnetic elements having a high accuracy and short response time may be employed.

Figure 3:
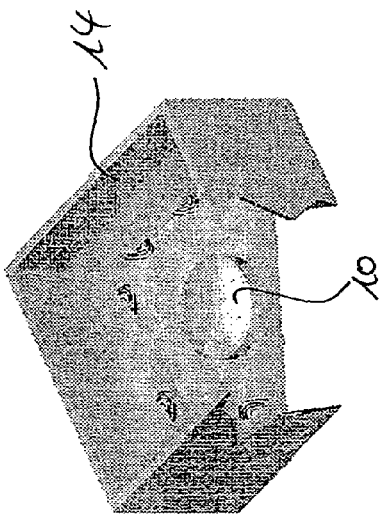
FIGS. 3a through 3f show method steps of a mirror manufacturing process according to the present invention.
Figure 3:
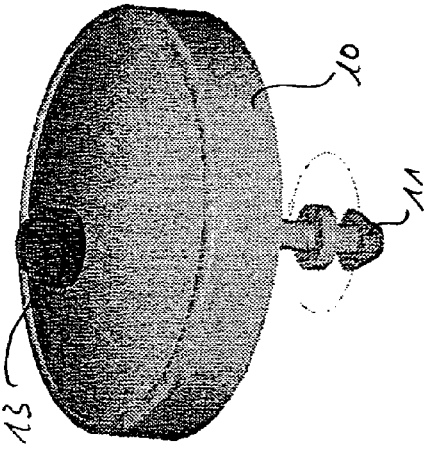
Figure 3:
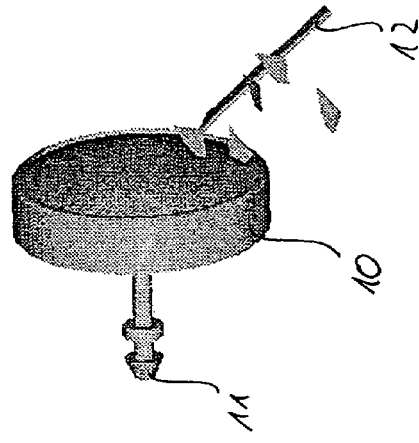
Figure 3:
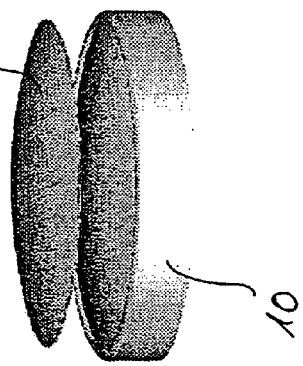
Figure 3:
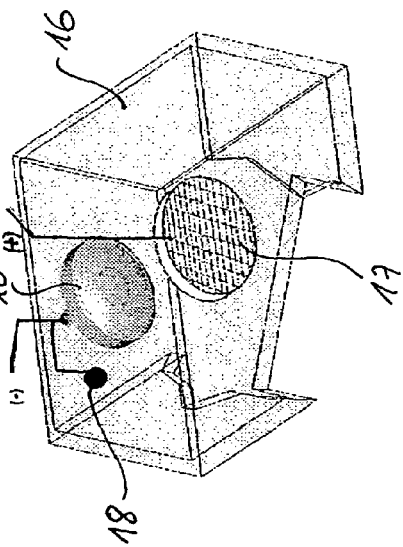
Figure 3:
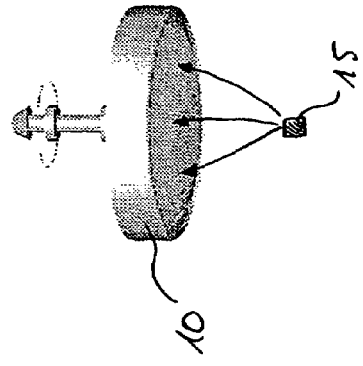

FIG. 3 schematically shows method steps for manufacturing an optical mirror or reflector element according to the present invention. In the method step a) a mandrel 10 fixed on a rotatable shaft 11 is machined using a suitable machining tool 12. In step b) the mandrel or masterpiece 10 is polished with a suitable polishing tool 13. Method steps a) and b) are known in the art of producing optical mirrors. To achieve a high geometrical accuracy and surface smoothness these method steps have to be carried out very carefully by skilled and experienced technicians. The manufacturing of a precise mandrel 10 is therefore time consuming and costly. As material for the mandrel glass, zerodur Polymetylmetacrylat (PMMA), composite material, and metal may be used.

Then, in method step c) mandrel 10 has to be cleaned by a cleaning chamber 14 in order to remove chemical contamination, dust and particles from the surface. In method step d) a reflective layer is deposited onto the curved surface of the mandrel, for example by evaporating or sputtering gold from a gold source 15. Other coating materials instead of high purity gold may also be employed. The reflective layer material may be optimized to ensure a maximum reflectivity in the desired operational wavelength range. The reflective layer indicated by reference numeral 26 (FIG. 4) has preferably a thickness of several ten nanometers to several hundred nanometers.

The process is continued with method step e) in which the mirror or reflector body 25 (FIG. 4) is made by electroforming. Electroforming facility 16 is filled with an electrochemical fluid, for example a mixture of nickel salt in water solution suitable to grow Ni shells. The mandrel 10 coated with the gold film 26 is located in the electroforming bath opposite to a positive electrode 17. Mandrel 10 as well as an additional electroforming sample 18 are connected with the negative electrode. Applying a voltage across the electrodes initiates the electrochemical process during which a nickel layer 25 is formed on the gold layer 26. As mentioned before the invention is not restricted to the use of these materials. Any suitable materials may be selected by the skilled person.

Simultaneously an electroforming sample 18 is grown by the same electrochemical process. This sample 18 is used to measure possible internal mechanical tensions building up through the electroforming process using suitable analyzing techniques. The process is then controlled such that these internal mechanical tensions can be minimized. The temperature of the electroforming bath is preferably between 40° C. and 70° C.

Now follows release step f). The mirror 21, 22 consisting of the mirror body 25 and the reflective layer 26 is uniformly and carefully released from mandrel 10. During this process step partial sticking of layer 26 to the mandrel is carefully avoided which would result in unwanted internal mechanical tension. For insuring a uniform release the cleaning step c) is essential.

Figure 4:
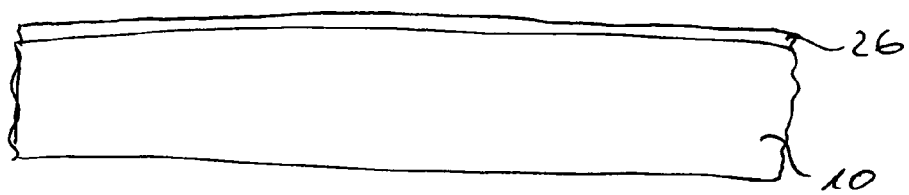
FIGS. 4a through 4c illustrate mirror manufacturing steps according to the present invention in more detail.
Figure 4:
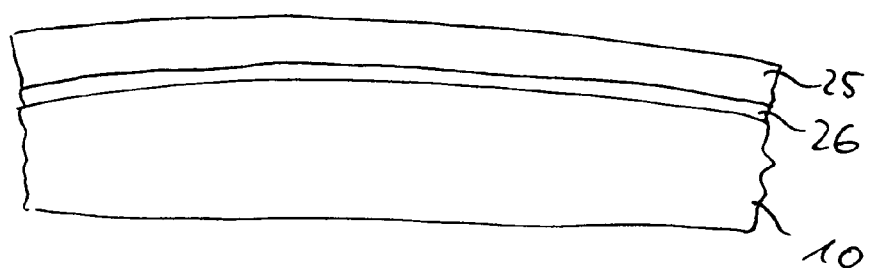
Figure 4:
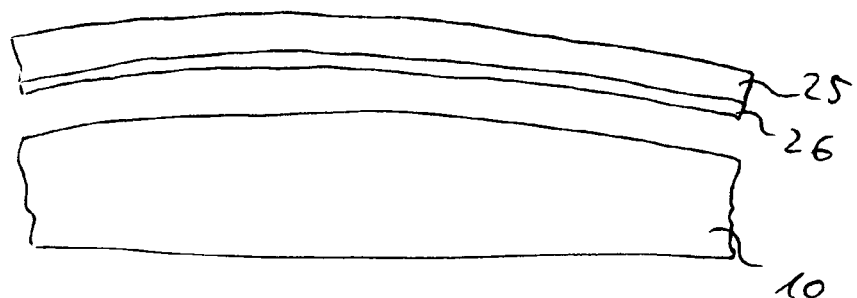

In FIG. 4 the method steps of reflective layer deposition, electroforming and release are depicted in more detail. FIG. 4a shows a portion of mandrel 10 on which the reflective (gold) layer 26 having a thickness of several ten to several hundred nanometers has been deposited. FIG. 4b shows the subsequent grown mirror body or shell 25. The adhesion of the reflective layer 26 (for example, gold) to the mirror shell 25 (for example, nickel) is higher than the adhesion of the reflective layer to mandrel 10. Shell 25 and reflective layer 26 are then released together from the mandrel. As can be seen from FIG. 4 the optical surface of reflection layer 26 is the surface which has formed the interface with the mandrel having a very high surface smoothness. Therefore the surface smoothness of the reflective layer 26 of the present invention is much better than that of a reflective layer obtained by deposition on a conventional mirror due to surface roughness caused by the deposition process.

The mirror or reflective element may be provided with a supporting structure as for example, a ring 23a as shown in FIGS. 2a and 2b. This supporting ring is particularly useful if the mirror shell 25 is thin compared to the reflector diameter. The supporting structure may be attached before or after the release step f) in FIG. 3. Preferably the supporting structure attachment step is carried out under temperature conditions similar to the operating temperature of the finished telescope.

For the supporting structure a material having a thermal expansion coefficient similar to that of the mirror shell is used. The deviation of the thermal expansion coefficient is preferably smaller than 1%, more preferably smaller than 0.1%. This avoids a building up of mechanical stresses in the mirror body causing unwanted geometrical distortions.

The present invention allows the production of high precision optical elements by an electroforming replication technique in which one or more objects are electroplated onto the precision surface of a mandrel (masterpiece) that is an exact negative of the required surface. The layer of the deposited metal forms an exact copy of the mandrel surface that is then separated from the produced optical element. During the production process the master can be coated with a variety of materials that are separated with the electroformed object during the release to form a monolithic structure that includes a reflective coating. The mandrel remains unchanged by the process and can then be reused so that the high cost of conventional polishing techniques is limited to the production of the mandrel and results in the production of low cost high precision mirrors. The process according to the invention is particularly advantageous for the production of optical elements which have a high curvature. This high curvature allows the production of compact telescopes. It is to be understood that the present invention is applicable to any desired data transmission carrier wavelength and that the expression 'optical' is not to be interpreted as restriction to the visible and infrared spectrum.

The invention claimed is:

1. A method of manufacturing a telescope mirror (21,22) comprising the steps of:
   (a) providing a mandrel (10) defining the geometry of the telescope mirror,
   (b) depositing a reflective layer (26) on the mandrel surface,
   (c) electroforming a mirror body (25) onto the reflective layer (26) by an electrochemical process,
   (d) releasing the mirror body (25) with the reflective layer (26) from the mandrel (10),
   (e) attaching to the mirror body (25) a supporting structure (23) comprising at least one of a ring geometry (23a) and at least one actuator (23b) for adapting and correcting the geometry of the telescope mirror, and
   wherein the electroforming process and the release process are controlled such that the building up of internal mechanism tension within the mirror body is suppressed.

2. The method according to claim 1, wherein the internal mechanism tension is measured during the electroforming process using an additional electroforming sample (18) which is electroformed in parallel or an electronic stress measurement device.

3. The method according the claim 1, further comprising the step of cleaning the mandrel (10) between the method steps (a) and (b).

4. The method according to claim 1, wherein the step of depositing the reflective layer (26) is carried out in a vacuum or electrochemical environment.

5. The method according to claim 1, wherein method step (d) is carried in clean room conditions.

6. The method according to claim 1, wherein the mirror body (25) is electroformed of Ni or Ni-alloy materials.

7. The method according to claim 1, wherein the electroforming step is carried out using an electrochemical liquid having a temperature of between 40° C. and 70° C.

8. The method according to claim 1, wherein the releasing step comprises releasing the mirror body (25) from the mandrel (10) such that the mandrel (10) remains unchanged.

9. The method according to claim 1, wherein the supporting structure (23) is attached to the mirror body before releasing the mirror body from the mandrel.

10. The method according to claim 1, wherein the supporting structure (23) is attached to the mirror body after releasing the mirror body from the mandrel.

11. The method according to claim 1, wherein the supporting structure attaching step is carried out under temperature conditions similar to the operating temperature of the telescope mirror.

12. The method according to claim 1, wherein the mandrel comprises one of glass, zerodur, Polymetylmetacrylat (PMMA), composite material and metal.

13. The method according to claim 1, wherein the reflective layer (26) comprises pure gold.

14. A method of manufacturing a telescope mirror (21,22) comprising the steps of:
   (a) providing a mandrel (10) defining the geometry of the telescope mirror, (b) depositing a reflective layer (26) on the mandrel surface, (c) electroforming a mirror body (25) onto the reflective layer (26) by an electrochemical process, and (d) releasing the mirror body (25) with the reflective layer (26) from the mandrel (10) without a supporting structure; and (e) attaching to the mirror body (25) a supporting structure (23) comprising at least one of a ring geometry (23a) and at least one actuator (23b) for adapting and correcting the geometry of the telescope mirror, wherein the electroforming process and the release process are controlled such that the building up of internal mechanism tension within the mirror body is suppressed.

15. The method according to claim 14, wherein the internal mechanism tension is measured during the electroforming process using an additional electroforming sample (18) which is electroformed in parallel or an electronic stress measurement device.

16. The method according to claim 14, wherein the reflective layer (26) comprises pure gold.

17. The method according to claim 14, wherein an optical surface is formed at an interface of the reflective layer (26) with the mandrel (10).

18. The method according to claim 14, wherein the mirror body (25) is electroformed of Ni or Ni-alloy materials.

19. The method according to claim 1, wherein an optical surface is formed on a side of the reflective layer (26) that is opposite a deposition side of the reflective layer (26).

20. A method of manufacturing a telescope mirror (21,22) comprising the steps of:

(a) providing a mandrel (10) defining the geometry of the telescope mirror, (b) depositing a reflective layer (26) on the mandrel surface, (c) electroforming a mirror body (25) onto the reflective layer (26) by an electrochemical process, (d) releasing the mirror body (25) with the reflective layer (26) from the mandrel (10) before any supporting structure is attached to the mirror body (25) and without changing the mandrel (10) such that the mandrel (10) can be reused to manufacture another telescope mirror; and (e) attaching to the mirror body (25) a supporting structure (23) comprising at least one of a ring geometry (23a) and at least one actuator (23b) for adapting and correcting the geometry of the telescope mirror, wherein the electroforming process and the release process are controlled such that the building up of internal mechanism tension within the mirror body is suppressed.

* * * * *